Jan. 16, 1962     W. F. NIKLAS     3,017,517
IMAGE CONVERTER
Filed Jan. 18, 1960     2 Sheets-Sheet 2
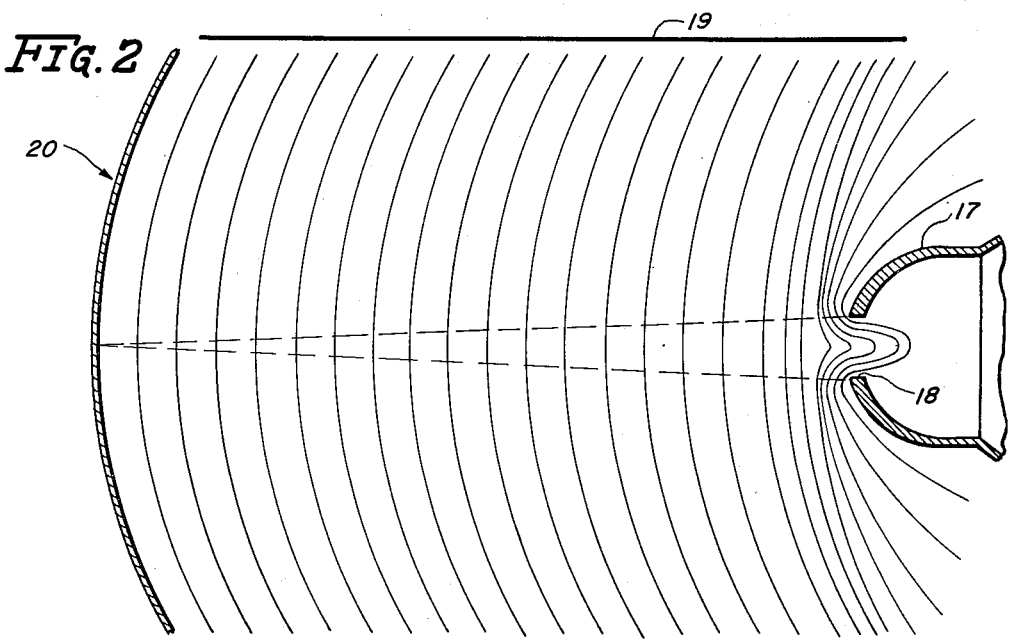
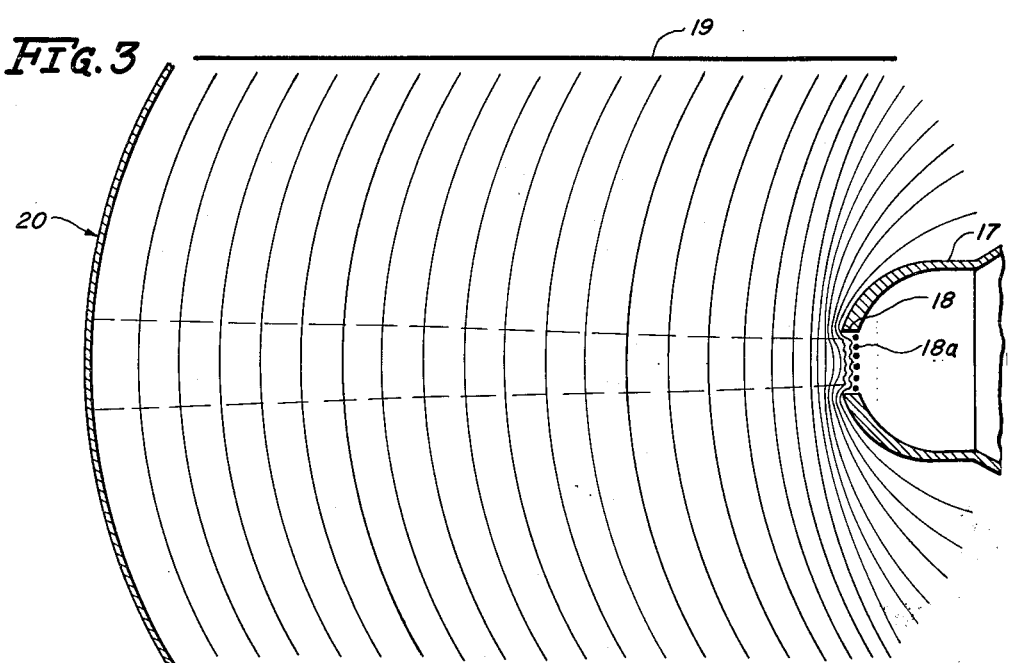
INVENTOR.
Wilfrid F. Niklas
BY
Atty.

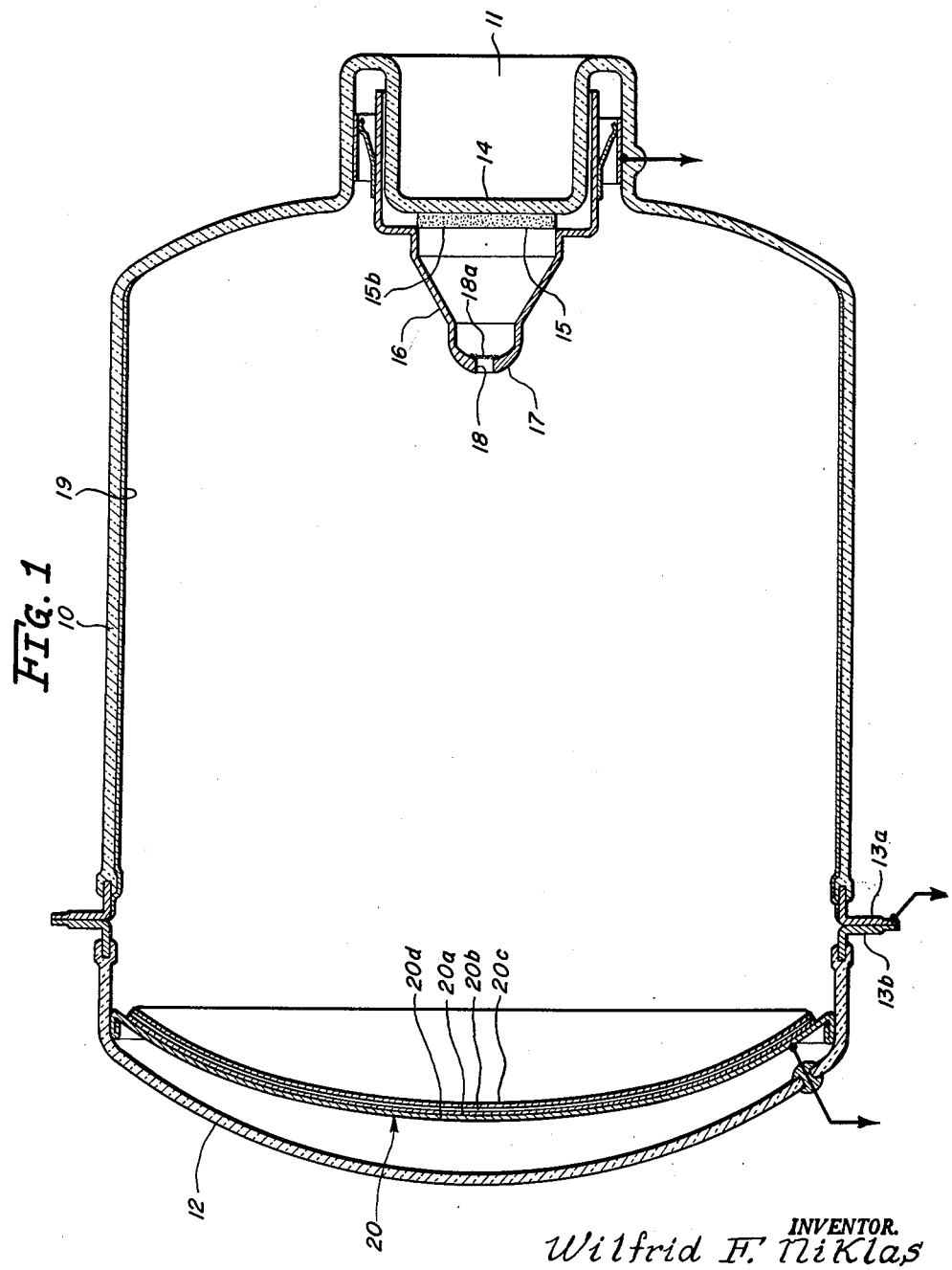

United States Patent Office 3,017,517
Patented Jan. 16, 1962

3,017,517
IMAGE CONVERTER
Wilfrid F. Niklas, Park Ridge, Ill., assignor to The
Rauland Corporation, a corporation of Illinois
Filed Jan. 18, 1960, Ser. No. 3,096
4 Claims. (Cl. 250—213)

This invention pertains to the construction of image converters and is especially directed to the structure of the electron-optical arrangement of such converters.

As usually constructed, a modern image converter comprises a photo-emissive cathode which is responsive to incident radiation to develop an electron image for projection upon a viewing screen. The cathode is part of an electron-optical system which also includes a cylindrical focusing electrode frequently having a diameter approximating the diameter of the cathode. An anode is also included in the electron-optical system spaced from the cathode beyond the focus electrode. Usually the anode has a much smaller diameter than the cathode and further has an aperture through which electrons which have been emitted, accelerated and focused in the electron-optical system pass to impact a fluorescent target serving as the viewing screen. It is customary to construct the cathode and frequently the leading portion of the anode which faces the cathode as concentric spherical sections of generally uniform radius and it has been found that the image plane of this electron-optical system, which may be characterized as an electrostatic triode system, is curved in a direction opposite to the curvature of the cathode and anode. The anode is apertured, which of course is required to achieve a real image on the fluorescent viewing screen, and the aperture lens thus formed is a divergent or negative lens which has a marked influence on the curvature of the image plane. The strength of this lens is related to the electric field strength in the immediate vicinity of the anode aperture, as described more particularly hereinafter, and it has also been found that prior art structures do not give a sufficient lens effect to realize the flatness of the image plane that is desired.

Moreover, the electric field distribution in the region between the anode aperture and the viewing screen has a pronounced effect on positive ions formed by electron collision in this region of the image converter. In fact, the field distribution of the conventional converter focuses such ions on the photocathode giving rise to a bright spot on the viewing screen which impairs the picture quality and is a major deficiency in the operation of most modern image converters.

It is an object of this invention, therefore, to provide a new and improved image converter which avoids or minimizes the aforedescribed difficulties of prior devices.

It is a particular object of the invention to provide a novel image converter in which the overall image definition is greatly improved.

Another specific object of the invention is to improve the electron-optical system of an image converter, particularly as determined by the structure of the anode thereof, to achieve a substantial reduction in secondary electron emission density and white spot effects.

A still further object of the invention is to improve the anode structure of an image converter to the end that the image plane of the system is flatter than that attained with prior art devices.

An image converter, constructed in accordance with the invention, comprises a photo-emissive cathode structure responsive to incident radiation to develop an electron image for propagation along a predetermined electron-optical path. There is a focus electrode disposed about the electron-optical path and an anode is positioned across that path. The anode has an aperture centered on the electron-optical path and through which electrons are focused by the focus electrode. A viewing screen is disposed across the path, following the anode, to be impinged by electrons issuing from the aperture of the anode. Finally, there is a conductive structure which is pervious to electrons disposed across the electron-optical path in the region between the anode aperture and the viewing screen.

In one specific embodiment of the invention a conductive mesh is mechanically and electrically connected to the inside of the anode aperture, that is to say, on the side of the aperture closest to the viewing screen. The invention will be described as embodied in an X-ray image intensifier although it will be understood that the inventive teachings may also be applied with advantage to image converters of other types.

The features of the present invention which are believed to be novel are set forth with particularity in the appended claims. The invention, together with further objects and advantages thereof, may best be understood, however, by reference to the following description taken in connection with the accompanying drawings in the figures of which like reference numerals identify like elements, and in which:

FIGURE 1 is a cross-sectional view of an X-ray image intensifier embodying this invention;

FIGURE 2 is a schematic representation of the electric field distribution and an ion-focusing effect encountered in image intensifiers having anode structures of the prior art; and FIGURE 3 is a schematic representation of the electric field distribution and ion-defocusing effects obtained in image intensifiers having an anode structure embodying the present invention.

The image converter represented in FIGURE 1 comprises a substantially cylindrical glass envelope section 10 having an end portion in the form of a re-entrant press 11 and a substantially spherical glass envelope section 12 of a diameter approximately equal to that of envelope section 10. Envelope sections 10 and 12 are presealed around their entire perimeters to respective metal flanges 13a and 13b which, in turn, are sealed together by heliarc welding or the like after the two envelope sections 10 and 12 have been separately processed.

The re-entrant section 11 is closed by a flat glass plate 14 on the inside of which a suitable fluorescent viewing screen 15 of silver activated zinc-cadmium sulfide or the like is provided. Screen 15 is preferably aluminized or otherwise provided with a conductive metallic backing layer 15b sufficiently thin to be pervious to impinging electrons. An electron-optical system within the tube causes electrons to impinge this screen in order to synthesize a visible image thereon.

The electron-optical system of the image converter includes a photosensitive cathode structure 20 which is generally referred to in the art as a composite multilayer pick-up screen. This cathode structure is suitably mounted within section 12 of the housing and is generally spherical in configuration. It is positioned transversely of and substantially coaxial of the axis of the tube which corresponds with the axis of an electron-optical path along which electrons emitted from the cathode are projected toward viewing screen 15. The cathode surface as viewed from viewing screen 15 is concave and comprises a support or base member 20d which is transparent to an incident radiation to which the image converter is intended to respond. While devices of the type under consideration may be constructed selectively to respond to radiations of different wavelength, the device illustrated will be assumed to be an X-ray image intensifier and therefore the end portion of envelope section 12 as well as the cathode base member 20d are constructed of material that is transparent to X-rays. The envelope section may of course be of glass and support 20d may be formed of aluminum. Its thickness is selected to give the required mechanical rigidity to the structure but otherwise the thickness should be of minimal dimension to increase the sensitivity of the device to the incident radiation.

Disposed immediately upon supporting member 20d is an X-ray sensitive phosphor layer 20a such as silver activated zinc sulfide or the like embedded in a suitable silicon resin. A barrier layer 20b which may be of aluminum oxide is superposed over phosphor layer 20a and a photo-emissive layer 20c is placed over the barrier layer. The photo-emissive layer is generally an antimony-cesium composition and constitutes the electron emitting surface of the cathode structure. This component of the image converter may be entirely conventional and will be familiar to those skilled in the art both as to its composition and method of manufacture.

A focus electrode 19 included in the electron-optical system focuses electrons issuing from the cathode to enter an anode aperture presently to be considered. The focus electrode may conveniently be constructed as a layer of conductive material such as copper or aluminum deposited on the inner portion of cylindrical section 10 of the tube housing. It extends to metal flange 13a which likewise is conductive to facilitate establishing the focus electrode at a desired operating potential.

The anode 16 of the electron-optical system is likewise disposed transversely and substantially coaxially of the tube and electron-optical axes. The anode structure shown is partially cylindrical and partially conical and has a centrally located aperture 18 provided in a cap or terminating portion 17 which is generally spherical in configuration. Anode aperture 18 provides access for electrons traversing the electron-optical system to an image plane which is symmetrical relative to the tube axis and spaced from the cathode surface beyond the anode surface. Preferably, the image plane corresponds to the greatest extent attainable with viewing screen 15. Within anode 16, in the region between aperture 18 and viewing screen 15, is placed a conductive element 18a the structure and purpose of which will be described hereinafter. The viewing screen 15 and conductive element 18a are electrically connected to and maintained at the same electrical potential as the anode.

Lead-in connections of conventional construction are relied upon to establish desired operating potentials for the cathode, anode and focus electrodes. These connections are designated symbolically by the construction lines terminating in arrowheads at the appropriate portions of the image intensifier as represented in FIGURE 1.

In operation cathode structure 20 is established at or near ground potential while a positive potential in a range of 25 to 35 kv. is applied to anode 16 and through it to conductive element 18a and to viewing screen 15. A much smaller positive potential, usually in the order of 500 volts, is applied to focus electrode 19. The cathode, anode and focus electrode collectively constitute what is known in the art as an electrostatic triode system.

When an X-ray image is directed to end section 12 of the envelope and impinges upon pick-up screen 20, it excites phosphor layer 20a which, in response thereto, emits a corresponding light image. The light image traverses barrier layer 20b and excites photo-emissive layer 20c which, in turn, emits an electron image which is the counterpart of the X-ray image initially received. The focusing and accelerating effects provided by focus electrode 19 and anode 16 cause the electron image to be projected along the optical system and to be focused through anode aperture 18 upon viewing screen 15. At this juncture, the electron image is converted to a visible image which is viewable on screen 15. The reduction in size attributable to the focusing of the image from the cathode surface, which is very much larger than the anode and viewing screen surface, contributes to a desired brightness gain.

If it be assumed for the moment that element 18a is not present, then anode structure 16 is typical of prior-art image converters and the electric field established therein is represented by the plot of equi-potential lines represented in full-line construction in FIGURE 2. Viewed from the cathode, the equi-potential lines are generally convex throughout most of the region from the cathode to the anode but they become concave in the region immediately adjacent the anode, producing a strong concave shaped potential field at the anode aperture 18 and extending therefrom in the direction of viewing screen 15. The lens formed by anode aperture 18 is divergent or negative and has a pronounced effect on the radius of curvature of the image plane. In order to procure the best picture resolution on the flat viewing screen 15, it is desirable that the image plane be as flat as possible and this may be governed by the strength of the divergent lens. If the field strength of the electron-optical system on the side of the anode aperture facing viewing screen 15 is decreased, the strength of the divergent lens increases and the image plane tends to become flat. In accordance with previous practices in the art, this is accomplished by increasing the length of the anode aperture.

In addition to curvature of the image plane, consideration must be given to the effect of the electric field on positive ions which may be produced in the region between anode aperture 18 and viewing screen 15 by collision of electrons with neutral gas molecules. Because of the potential gradient along the tube axis, positive ions that may be generated tend to move in the direction of cathode 20. It may be shown that a convex electric field, convex as seen in the direction of propagation of the positive ions, exerts a focusing effect on the ions as represented by the broken-construction lines in FIGURE 2. Accordingly, positive ions produced in the anode-viewing screen region of image converters employing conventional anode structures tend to be focused rather sharply toward the center of photocathode 20. Impacting of the photocathode by the focused beam of positive ions releases secondary electrons which, in turn, are focused in the normal way and give rise to a bright spot on screen 15 in the immediate vicinity of the electron optical and tube axes.

From the foregoing considerations, it will be appreciated that image converters constructed in accordance with previous practices, especially in relation to the anode structure, suffer from two undesirable limitations. The electric field within the anode structure is too strong to provide a desired flattening of the image plane and is sufficiently convex to produce ion focusing effects which result in an undesirable white spot or dilution of contrast in the central portion of the viewing screen. These difficulties are greatly alleviated and minimized in accordance with the present invention by the inclusion of conductive element 18a within the anode structure.

More particularly element 18a is a conductive mesh which may be positioned within anode aperture 18 or, for ease of fabrication, at the face of the anode aperture which is on the side toward viewing screen 15. The conductive mesh may be mechanically supported from anode cap 17 and is conductively connected therewith to be maintained at anode potential. As a consequence, the electric field pattern within the image converter changes from that represented in FIGURE 2 where the anode structure has no such conductive mesh to that represented schematically in FIGURE 3. Once again, the full lines represent lines of equi-potential.

The presence of mesh 18a minimizes the portion of the electric field in the immediate vicinity of anode aperture 18 which, viewed from cathode structure 20, is concave, reducing both its intensity and the extent to which it projects through anode aperture 18 in the direction of viewing screen 15. This restriction of the electric field strengthens the divergent or negative lens created at anode aperture 18 with the desirable result of materially flattening the image plane over and above that heretofore achieved with practices of the prior art. As explained above, the strength of this lens is increased if the concave field between anode aperture 18 and viewing screen 15 is decreased. A direct benefit from flattening of the image plane is an improved and uniform resolution over the entire viewing surface of screen 15.

Additional benefits inuring from this improved structure have to do with freedom from adverse effects of ions and ion focusing. By restricting the field excursion into the region beyond anode aperture 18 in the direction of viewing screen 15, there is less tendency for positive ions to be drawn from this region for propagation toward cathode 20. Additionally, by the described modification of the electric field, those positive ions which are propagated in the direction of the cathode encounter a greatly reduced convex field, convex in the direction of ion propagation, with the end result that the ion-focusing effect is substantially eliminated. This is represented by the broken-construction lines in FIGURE 3 connoting that ions which do reach the cathode are, contrasted with the ion-bombardment condition of FIGURE 2, dispersed over the cathode structure. This dispersal of such ions as reach the cathode essentially eliminates the bright spot or washing out of the central portion of viewing screen 15 characteristic of previous structures as described hereinabove.

The structures represented in FIGURES 2 and 3 may likewise be contrasted in terms of effective lens volume which is the product of lens cross section and diameter. In the structure of FIGURE 2, there is but a single lens representing a volume equal to the product of the cross sectional area and the diameter of aperture 18. In FIGURE 3, on the other hand, this single aperture lens is, in effect, replaced with a large number of interstitial lenses defined by conductive mesh 18a and each such interstitial lens has a comparatively small aperture volume. The integrated or total aperture volume of the multiple interstitial lenses of the structure of FIGURE 3 is materially smaller than the volume of the single aperture lens shown in FIGURE 2. Since essentially only those positive ions generated within the lens volume are accelerated toward cathode 20, the conversion from the single aperture lens of FIGURE 2 to the multiplicity of incremental lenses of FIGURE 3 provides substantial relief from positive ions.

There is an obvious disadvantage attributable to mesh 18a in that some of the electrons traveling the electron optical path are intercepted by the conductors of the mesh. This effect is related to the optical transmission of the mesh and may be compensated by appropriate spacing of screen 15. In other words, the electrons traversing the electron optical path from cathode 20 toward screen 15 are subjected to the lens effects of the interstitial spaces of mesh 18. In order that the mesh or conductive structure may not be visible on the viewing screen, the elementary electron beams issuing through the multiplicity of electron lenses must cross over or be diverged before reaching the screen. In the case at hand, since the anode aperture is a divergent lens, they are diverged and no image of the mesh appears on the screen. The position of the screen in relation to anode aperture 18a is chosen to obtain optimum focus and minimum distortion over the entire screen area.

In one physical embodiment of this structure found to produce images on screen 15 that are substantially free of bright spot and exhibit substantially uniform resolution over the screen area, the following dimensions were employed:

Diameter of focus electrode 19 _____ 9½ inches.
Maximum diameter of useful
  cathode surface _____ 9 inches.
Diameter of anode aperture 18 _____ 0.228 inch.
Conductive structure 18a _____ 120 to 200 nickel mesh.
Distance from anode aperture 18
  to viewing screen 15 _____ 25/32 inches.
Diameter of viewing screen 15 _____ 2 inches.

It is preferred that mesh 18a be similar to screening, with conductive elements arrayed in mutually perpendicular relation to define rectangular-shaped elemental lenses. However, if desired, element 18a may be a simple grid-like array of parallel-arranged conductors. Also, element 18a may be positioned within aperture 18 or immediately at its leading or trailing faces.

While a particular embodiment of the present invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An image converter comprising: a photo-emissive cathode structure responsive to incident radiation to develop an electron image for propagation along a predetermined electron-optical path; a focus electrode disposed about said path; an anode positioned across said path having an aperture centered on said path through which electrons are focused by said focus electrode; a viewing screen likewise disposed across said path to be impinged by electrons issuing from said aperture of said anode; and a conductive structure, which is pervious to electrons, disposed across said path in the region between said anode aperture and said viewing screen.

2. An image converter comprising: a photo-emissive cathode structure responsive to incident radiation to develop an electron image for propagation along a predetermined electron-optical path; a focus electrode disposed about said path; an anode positioned across said path having an aperture centered on said path through which electrons are focused by said focus electrode; a viewing screen likewise disposed across said path to be impinged by electrons issuing from said aperture of said anode; and a conductive structure, which is pervious to electrons, disposed across said path in the region between said anode aperture and said viewing screen and maintained at the potential of said anode.

3. An image converter comprising: a photo-emissive cathode structure responsive to incident radiation to develop an electron image for propagation along a predetermined electron-optical path; a focus electrode disposed about said path; an anode positioned across said path having an aperture centered on said path through which electrons are focused by said focus electrode; a viewing screen likewise disposed across said path to be impinged by electrons issuing from said aperture of said anode; and a conductive structure, which is pervious to electrons, disposed across said path in the region between said anode aperture and said viewing screen and electrically as well as mechanically connected to said anode.

4. An image converter comprising: a photo-emissive cathode structure responsive to incident radiation to develop an electron image for propagation along a predetermined electron-optical path; a focus electrode disposed about said path; an anode positioned across said path having an aperture centered on said path through which electrons are focused by said focus electrode; a viewing screen likewise disposed across said path to be impinged by electrons issuing from said aperture of said anode; and a conductive mesh supported by said anode and disposed across said aperture thereof.

References Cited in the file of this patent

UNITED STATES PATENTS 2,834,889    Fries _____ May 13, 1958

UNITED STATES PATENT OFFICE
CERTIFICATE OF CORRECTION

Patent No. 3,017,517 January 16, 1962

Wilfrid F. Niklas

It is hereby certified that error appears in the above numbered patent requiring correction and that the said Letters Patent should read as corrected below.

Column 3, line 9, for "silicon" read -- silicone --.

Signed and sealed this 29th day of May 1962.

(SEAL)
Attest:

ERNEST W. SWIDER
Attesting Officer

DAVID L. LADD
Commissioner of Patents